United States Patent [19]

Maezawa et al.

[11] Patent Number: 4,882,020
[45] Date of Patent: Nov. 21, 1989

[54] PROCESS FOR TREATING EFFLUENT GAS

[75] Inventors: Akihiko Maezawa, Kanagawa; Yoshio Nakajima; Mitsuyoshi Kaneko, both of Tokyo; Shinji Aoki, Tokyo, all of Japan

[73] Assignee: Ebara Corporation, Tokyo, Japan

[21] Appl. No.: 199,859

[22] Filed: May 27, 1988

[30] Foreign Application Priority Data

May 30, 1987 [JP] Japan .................................. 62-136067
Dec. 7, 1987 [JP] Japan .................................. 62-308887

[51] Int. Cl.⁴ ............................................. B01J 19/08
[52] U.S. Cl. ............................. 204/157.3; 204/157.44; 204/158.2
[58] Field of Search ............... 204/157.3, 157.44, 158.2

[56] References Cited

U.S. PATENT DOCUMENTS

| | | | |
|---|---|---|---|
| 3,869,362 | 3/1975 | Machi | 204/157.3 |
| 3,984,296 | 10/1976 | Richards | 204/157.3 |
| 4,004,995 | 1/1977 | Machi | 204/157.3 |
| 4,097,349 | 6/1978 | Zenty | 204/157.3 |
| 4,294,674 | 10/1981 | Aoki | 204/157.3 |
| 4,324,759 | 4/1982 | Aoki et al. | 422/62 |
| 4,507,265 | 3/1985 | Higo | 204/157.3 |

FOREIGN PATENT DOCUMENTS

| | | | |
|---|---|---|---|
| 3020301 | 2/1981 | Fed. Rep. of Germany . | |
| 3403726A1 | 8/1985 | Fed. Rep. of Germany ... | 204/157.3 |
| 3608291 | 4/1987 | Fed. Rep. of Germany . | |
| 3622621 | 1/1988 | Fed. Rep. of Germany . | |
| 50-40463 | 8/1973 | Japan . | |
| 49-95866 | 9/1974 | Japan . | |
| 49-107959 | 10/1974 | Japan | 204/157.3 |
| 50-40462 | 4/1975 | Japan . | |
| 50-57064 | 5/1975 | Japan . | |
| 51-8636 | 3/1976 | Japan . | |
| 52-136879 | 11/1977 | Japan . | |
| 52-140499 | 11/1977 | Japan . | |
| 55-97233 | 7/1980 | Japan . | |

OTHER PUBLICATIONS

English Translation of 51-8636.
English Translation of 50-57064.
K. Kawamura, "Electron Beam Processing of Combustion Flue Gases", (1987), International Atomic Energy Agency.
English Translation of Japanese Patent 52-136879.
English Translation of Japanese Patent 52-140499.

Primary Examiner—John F. Niebling
Assistant Examiner—Ben C. Hsing
Attorney, Agent, or Firm—Oblon, Spivak, McClelland, Maier & Neustadt

[57] ABSTRACT

A process for treating an effluent gas which includes the steps of leading an effluent gas containing sulfur oxides ($SO_x$) and/or nitrogen oxides ($NO_x$) to a radiation irradiation zone, adding ammonia ($NH_3$) to the effluent gas before, during or after the irradiation, collecting resulting ammonium sulfate and/or ammonium nitrate by means of a dust collector, and releasing the effluent gas into the atmosphere. The desulfurization and/or denitration rate is improved by using as the dust collector a bag filter alone or a combination of an electrostatic precipitator and a bag filter, and adjusting the effluent gas temperature at the outlet of the bag filter within the range of from a temperature at which the humidity of the effluent gas is saturated to 100° C.

16 Claims, 6 Drawing Sheets

PROCESS FOR TREATING EFFLUENT GAS

BACKGROUND OF THE INVENTION

The present invention relates to an improvement in a process for treating an effluent gas by irradiation with a form of radiation. More particularly, t he present invention pertains to an improvement in the desulfurizing and denitrating efficiency in a process for purifying an effluent gas in which desulfurization and denitration are mainly effected by utilizing both addition of ammonia and irradiation with a form of radiation The term "desulfurization" is employed in this specification to mean removal of sulfur oxides (generally abbreviated to "$SO_x$" contained in effluent gases in various forms, while the term "denitration" means removal of nitrogen oxides (generally abbreviated to "$NO_x$") also contained in effluent gases in various forms. A large volume of combustion gases is ceaselessly generated by factories and electric power plants every day. These effluent gases contain at least either one of $SO_x$ and $NO_x$, without exception, although the actual $SO_x$ or $NO_x$ content depends on the kind of effluent gas. $SO_x$ and $NO_x$ are usually contained in effluent gases as harmful gas components. Accordingly, it is essential to desulfurize and denitrate effluent gases before they are released into the atmosphere in order to prevent air pollution.

A variety of desulfurizing and denitrating processes have heretofore been proposed and put into practical use. However, many of them are wet processes which use a large amount of water or a specific chemical substance, and therefore it is necessary to treat a large amount of the waste water and slurry generated as by-products, which represents another difficult problem. In particular, treatment of an effluent gas having a relatively high content of harmful gas components produces an exceedingly large amount of waste water and slurry, so that it is difficult to treat them. Thus, the prior art effluent gas treating techniques are not necessarily satisfactory.

SUMMARY OF THE INVENTION

It is an object of the invention to provide a practical control method of the gas temperature at the upstream and/or downstream side of the reactor to improve the desulfurization and denitration efficiency from an effluent gas in which desulfurization and denitration are mainly effected by utilizing both addition of ammonia and irradiation with a form of radiation.

Other objects and advantages of the present invention may become apparent to those skilled in the art from the following description and disclosure.

DETAILED DESCRIPTION OF THE INVENTION

The present invention will be described hereinunder in detail.

Figure 4:
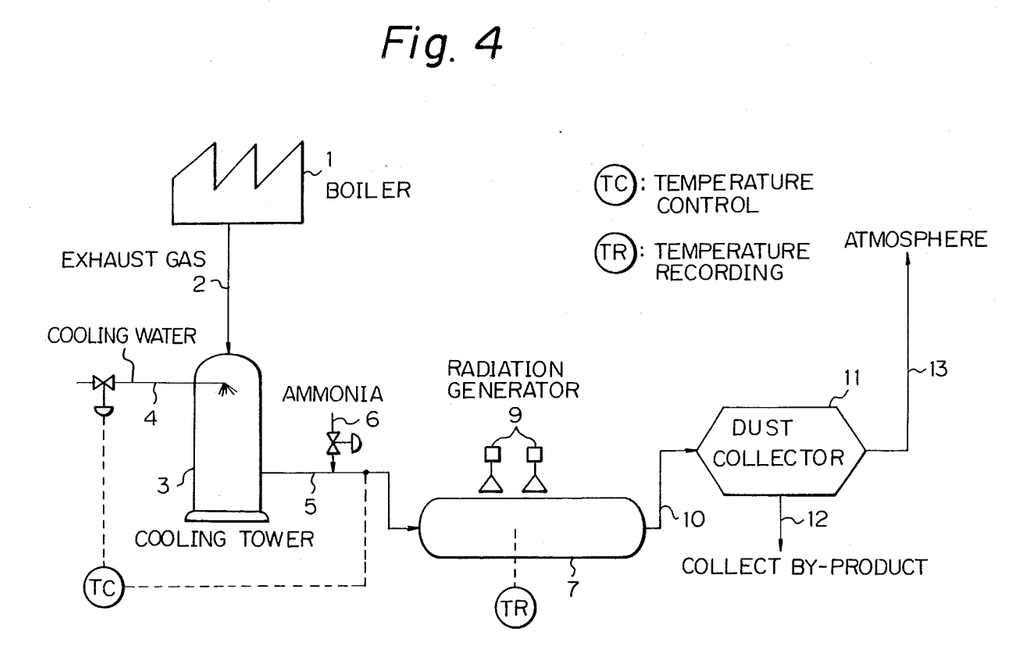
FIG. 4 is a flow sheet showing the prior art process for treating an ammonia-added effluent gas by irradiation with radiation in which the gas temperature is adjusted, this prior art being described in the specification of Japanese Patent No. 1,171,144.

In order to overcome the above-described disadvantages, a process for treating effluent gases by irradiation with a form of radiation has already been studied and developed. This prior art is a dry process and enables toxic gas components contained in effluent gases on the ppm order to be directly converted into solid particles. Consequently, no secondary problem of handling waste water and slurry occurs, and it is possible to recover $SO_x$ and $NO_x$ in the form of chemical fertilizers of commercial value. Accordingly, if the $SO_x$ and $NO_x$ contents are high, it may be even more advantageous from the viewpoint of cost. FIG. 4 is a flow sheet schematically showing a typical process for treating an ammonia-containing effluent gas (the ammonia having been added) by irradiation with a form of radiation. An effluent gas (generally at a high temperature, i.e., 130° C. or more) containing $SO_x$ and/or $NO_x$ which is generated from a boiler 1 is introduced through an effluent gas duct 2 into a cooling tower 3 where it is cooled by means of cooling water sprayed from a cooling water supply pipe 4 so that the gas temperature at the central portion of a reactor 7 is 50° to 80° C, and the cooled effluent gas is then introduced into the reactor 7 through an effluent gas duct 5. At the intermediate portion of the duct 5, ammonia is added to the effluent gas from an ammonia introducing means 6. The effluent gas introduced into the reactor 7 is irradiated with radiation from a radiation generator 9. As a result, the $SO_x$ and/or $NO_x$ contained in the effluent gas is changed into ammonium sulfate and/or ammonium nitrate, which is then collected by means of a dust collector. The purified effluent gas is then released into the atmosphere through a duct or a smokestack 13.

The effluent gas treating process wherein the temperature of the effluent gas is adjusted, explained with reference to FIG. 4, is described in the specification of our prior invention (Japanese Patent No., 1,171,144). The feature of this prior art resides in that the gas temperature at the central portion of the irradiation zone (reactor) is adjusted within the range of from 50° to 80° C. This temperature range was specified on the basis of the data obtained from examination of effluent gases containing about 200 ppm of $SO_x$ or $NO_x$. The present inventors have since conducted various further experiments which have revealed that, in the case of an effluent gas having a high $SO_x/NO_x$ content, e.g., coal combustion gas, there is no increase in the rate of removal of $SO_x/NO_x$ even if the gas temperature at the central portion of the reactor is adjusted to 50°–80° C. because the gas temperature at the outlet of the reactor is raised due to the large quantity of heat generated from the reaction of $SO_x/NO_x$ and $NH_3$ (described later).

There are cases where the gas temperature at the inlet of the reactor must be adjusted to 50° C. or less in order to make sure that the gas temperature at the central portion of the reactor is in the range of from 50° to 80° C. In such a case, if, for example, an effluent gas containing 8.5vol % of water and having a temperature of 150° C. at the inlet of the cooling tower is cooled down in the cooling tower by utilizing the latent heat of vaporization of sprayed water, the humidity of the effluent gas is saturated at about 53° C. In order to lower the temperature of the gas even further in such a state to 50° C., the sensible heat of water must be utilized. In this case, however, drain water is generated because of the temperature being lower than the water saturation temperature, and hence the process is no longer a dry process. Thus, if the gas temperature at the central portion of the reactor is merely adjusted to 50°–80° C., it may be impossible to conduct a dry process.

The following is a description of the principle of the removal of $SO_x$ and $NO_x$ effected by the above-described process for treating an ammonia-added effluent gas by irradiation with a form of radiation.

When an effluent gas is irradiated with radiation, OH, O and $HO_2$ radicals, which have very strong oxidizing power, are generated from oxygen and water molecules which are present in the effluent gas. These active radicals oxidize $SO_x$ and $NO_x$ within an extremely short period of time to form $H_2SO_4$ and $HNO_3$. $H_2SO_4$ and $HNO_3$ thus formed then react with the ammonia added to the effluent gas to form $(NH_4)_2SO_4$ (ammonium sulfate) and $NH_4NO_3$ (ammonium nitrate), respectively. Typical reactions taking place in the process of the above-described formation of ammonia sulfate and ammonium nitrate may be expressed as follows:

(1)

(2)

(3)

(4)

(5)

The process for treating an ammonia-containing effluent gas by irradiation with radiation (hereinafter referred to as the "irradiation treatment") may be generally regarded as an exothermic reaction. Roughly speaking, there are two reasons for the generation of heat. One of the causes is an exothermic phenomenon in which the radiation energy which is applied to and absorbed by the effluent gas changes to heat energy, which constitutes one of the causes for the rise in temperature of the effluent gas. Assuming that the absorbed dose, flow rate and density of the effluent gas are D(Mrad), Q(Nm$^3$/h) and $\rho$(kg/Nm$^3$), respectively, the quantity C(kcal/h) of heat generated by the absorption of the radiation energy is given by the following equation:

$$C2.39 = D \times Q \times \rho \text{(kcal/g)} \ldots \quad (6)$$

The other cause for the generation of heat is the heat generated by the desulfurization reaction [i.e., the reactions of the above-described formulae (2) and (3)] and the denitration reaction [i.e., the reactions of the formula (4) and (5)]. Assuming that the flow rate Q of the effluent gas is the same as that described above, the $SO_x$ concentration in the untreated effluent gas is $[SO_x]$ (ppm), the desulfurization rate is $\eta SO_x$, the $NO_x$ concentration of the untreated effluent gas is $[NO_x]$ (ppm) and the denitration rate is $\eta NO_x$, the quantity A(kcal/h) of heat generated by desulfurization and the quantity B(kcal/h) of heat generated by denitration may be respectively given by the following equations $$A = Q \times [SO_{gx}] \times \eta SO_x \times 10^{-6} \times 10^3 \times \\ 1/22.4 \times 131.02 \text{ (kcal/h)} \quad (7)$$

$$B = Q \times [NO_x] \times \eta NO_x \times 10^{-6} \times 10^3 \times 10^3 \times \\ 1/22.4 \times 68.93 \text{ (kcal/h)} \quad (8)$$

Accordingly, assuming that the specific heat of the effluent gas is c(kcal/kg° C.), the rise $\Delta T$(°C.) in temperature of the effluent gas caused by the irradiation treatment is given by the following equation:

$$\Delta T = \frac{A + B = C}{Q \times \rho \times c} \text{ (°C.)} \quad (9)$$

One example of treatment of an effluent gas will be shown hereinunder, specifically by the use of each of the above-described equations, and on the assumption that $$\rho = 1.3 \ (k/Nm^3)$$
$$c = 0.27 \ (kcal/kg \ °C.)$$

If an electric power plant having a power generating capacity of 300 MW is taken by way of example, the flow rate of the effluent gas may be estimated to be approximately 1,000,000 Nm$^3$/h. Assuming that tho concentrations of $SO_x$ and $NO_x$ in the effluent gas are 2,000 ppm and 300 ppm, respectively, and the dose of electron beam which is applied to the effluent gas is 1.8 Mrad in terms of the absorbed dose, the rise in temperature of the effluent gas caused when the effluent gas is treated by the irradiation treatment will be as follows:

According to the equation (6)

$$C = 2.39 \times 1.8 \times 1,000,000 \times 1.3$$
$$= 5,592,600 \text{ (kcal/h)}$$

According to the equation (7), $$A = 1,000,000 \times 2,000 \times 1.0 \times 10^{-6} \times 10^3 \times \\ 1/22.4 \times 131.02 = 11,698,214 \text{ (kcal/h)}$$

According to the equation (8), $$B = 1{,}000{,}000 \times 300 \times 1.0 \times 10^{-6} \times 10^3 \times$$
$$1/22.4 \times 68.93 = 923{,}170 \text{ (kcal/h)}$$

Hence, according to the equation (9)

$$\Delta T = \frac{A + B + C}{Q \times \rho \times c}$$
$$= \frac{11{,}698{,}214 + 923{,}170 + 5{,}592{,}600}{1{,}000{,}000 \times 1.3 \times 0.27}$$
$$= \frac{11.70 \times 10^6 + 0.923 \times 10^6 + 5.59 \times 10^6}{10^8 \times 1/3 \times 0.27}$$
$$= \frac{18.21}{1.3 \times 0.27} \approx 52 \text{ (°C.)}$$

Thus, the treatment of an effluent gas containing $SO_x$ and $NO_x$ at high concentrations causes a temperature rise of about 52° C. in the above-described example. Therefore, the gas temperature at the inlet of the reactor was adjusted to 53° C., while the gas temperature at the central portion of the reactor was adjusted to 79° C.

$$\left\{ \frac{\text{Inlet 53° C.} + \text{Outlet (53° C.} + 52° \text{C.)}}{2} \right\}.$$

As a result, the gas temperature at the outlet of the reactor was high, i.e., 105° C., and there was therefore no improvement in the rates of removal of $SO_x$ and $NO_x$. In other words, it was revealed that the gas temperature at the downstream side of the reactor is more important than that at the central portion of the reactor.

Further, as a result of testing an effluent gas containing $SO_x$ and $NO_x$ at high concentrations at this time, a thermochemical reaction of the following formula was newly found to be present as a desulfurization reaction:

$$SO_x + 2H_2O + 1/2O_2 \rightarrow (NH_4)_2SO_4 \ldots \quad (10)$$

Figure 1:
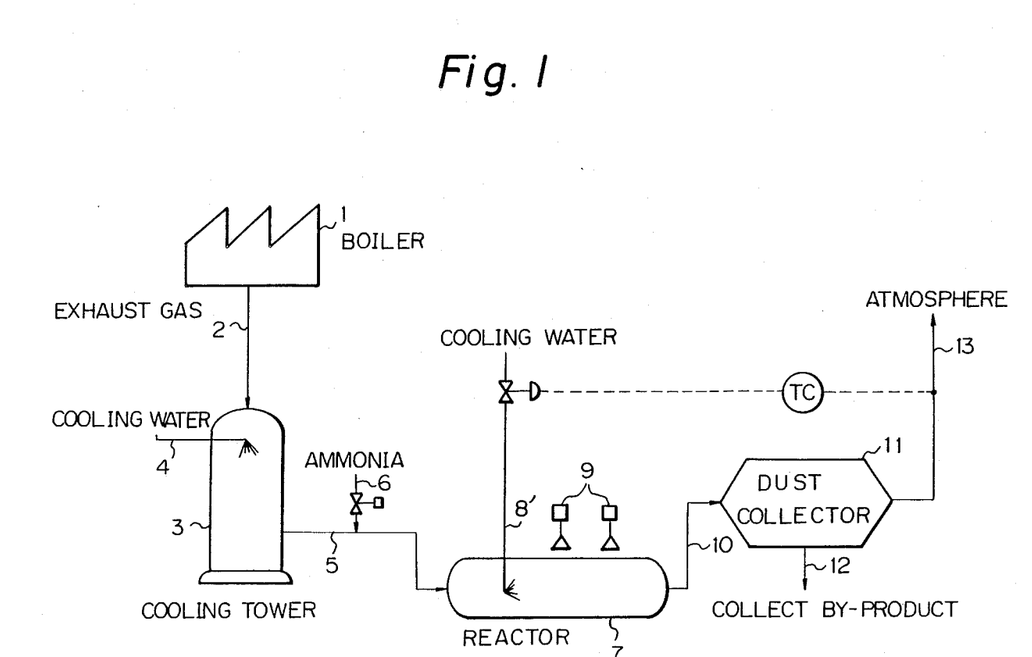
FIG. 1 is a flow sheet showing one embodiment of the process for treating an ammonia-added effluent gas by irradiation with radiation according to the present invention in which the effluent gas is sprayed with cooling water at a position which is immediately upstream of the irradiation zone.

It has been found that the newly found reaction goes on a great deal within an electrostatic precipitator (ESP) and/or a bag filter which are disposed at the downstream side of the reactor, and the reaction depends to a great extent on temperature, i.e., the lower the temperature, the higher the rate of reaction Thus, the present inventors have invented a practical temperature control method for use in the effluent treating process of this application One embodiment of the present invention will be described hereinunder with reference to FIG. 1. An effluent gas (generally at a high temperature, i.e., 130° C. or more) containing $SO_x$ and/or $NO_x$ which is generated from a boiler I is introduced through an effluent gas duct 2 into a cooling tower 3 where it is cooled by means of cooling water sprayed from a cooling water supply pipe 4 so that the gas temperature is in the rang of from a temperature at which the humidity of the effluent gas is saturated to 100° C., and the cooled effluent gas is then introduced into a reactor 7 through an effluent gas duct 5. At the intermediate portion of the duct 5, ammonia is added to the effluent gas from an ammonia introducing means 6. The effluent gas introduced into the reactor 7 is irradiated with radiation from a radiation generator 9. The effluent gas is sprayed with cooling water from a cooling water supply pipe 8' which is fixed at a position upstream of the irradiation zone inside the reactor. As a result, the $SO_x$ and/or $NO_x$ contained in the effluent gas is changed into ammonium sulfate and/or ammonium nitrate which is then collected by means of a dust collector. The purified effluent gas is then released into the atmosphere through a duct or a smokestack 13.

The reason why the effluent gas is sprayed with cooling water from the water supply pipe 8' is that the rise in temperature of the effluent gas which is caused by the absorption of the radiation energy and the generation of heat by the desulfurization and denitration reactions is prevented by making use of the latent heat of vaporization of the sprayed water to adjust the gas temperature at the outlet of the dust collector.

Examples of the dust collector which may be employed in the present invention include a bag filter alone, an electrostatic precipitator (hereinafter referred to as an "ESP") alone, or a combination of an ESP and a bag filter. When an ESP and a bag filter are employed in combination, it is preferable to spray the effluent gas with cooling water so that the gas temperature at the outlet of the bag filter is in the range of from a temperature at which the humidity of the effluent gas is saturated to 100~C. In the case of an ESP alone, it is preferable to spray the effluent gas with cooling water so that the gas temperature at the outlet of the ESP is in the range of from a temperature at which the humidity of the effluent gas is saturated to 90~C.

Figure 2:
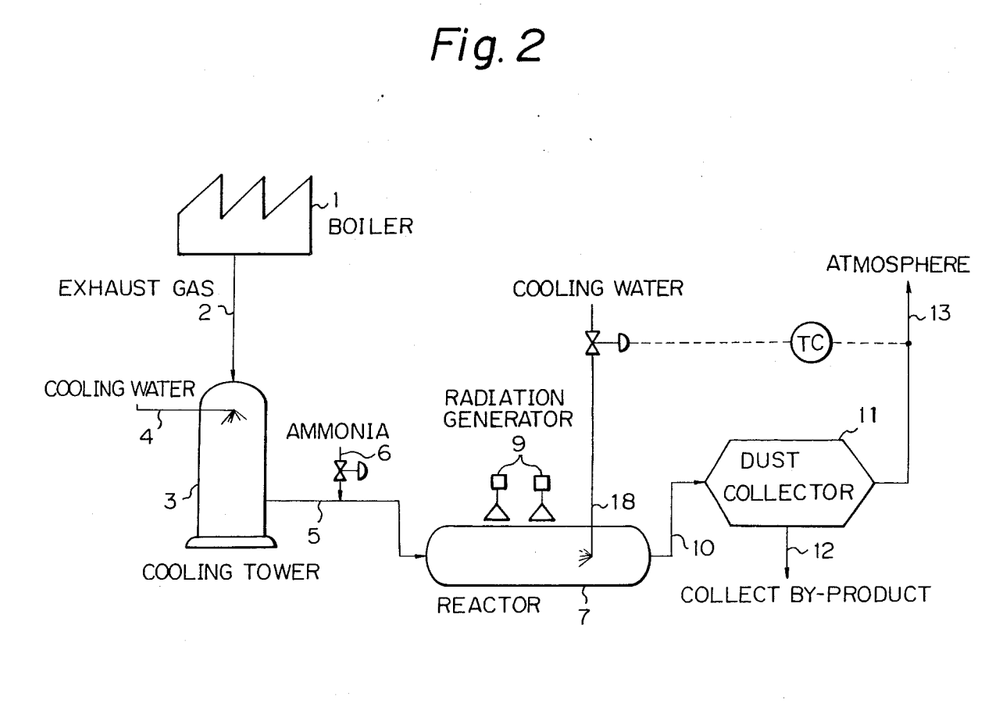
FIG. 2 is a flow sheet showing another embodiment of the process for treating an ammonia-added effluent gas by irradiation with radiation according to the present invention in which the effluent gas is sprayed with cooling water at a position which is immediately downstream of the irradiation zone.

FIG. 2 shows another embodiment of the present invention, which is an improvement of the process according to the first embodiment shown in FIG. 1. This embodiment differs from the first embodiment in that the position where the effluent gas is sprayed with cooling water is changed from the upstream side to the downstream side of the irradiation zone in the reactor. This change in the water spraying position is based on the results of experiments carried out by the present inventors. More specifically, when the effluent gas was sprayed with cooling water at a position downstream of the irradiation zone, the rates of
removal of $SO_x$ and $NO_x$, particularly the denitration rate, were improved, as described later in Examples.

The improvement that is achieved by the process shown in FIG. 2 is attributable to the following reasons. In the process shown in FIG. 1, minute droplets of water sprayed into the reactor vaporize therein, thus causing the effluent gas temperature to drop by virtue of the latent heat of vaporization. When passing through the irradiation zone in the reactor together with the effluent gas, these droplets of water directly absorb a part of the radiation to which the effluent gas is subjected. The radiation energy absorbed by the droplets of water changes to heat inside the droplets and is consumed merely in vaporization of the water droplets. Therefore, the radiation energy does not contribute to the generation of active radicals in the effluent gas which is the primary object of the irradiation.

In regard to the direction in which cooling water is sprayed, it has been confirmed that satisfactory results are obtained by spraying cooling water in the same direction as the flow of the effluent gas (i.e., the parallel flow system). However, it has been revealed that even more favorable results are obtained by spraying cooling water counter to the flow of the effluent gas (i.e., the counter flow system), as shown in FIG. 2. It is considered that, in the case of the counter flow system, the gas flow is made turbulent at the position where the sprayed water and the effluent gas collide with each other, and the vaporization of water droplets is thereby accelerated.

Figure 3:
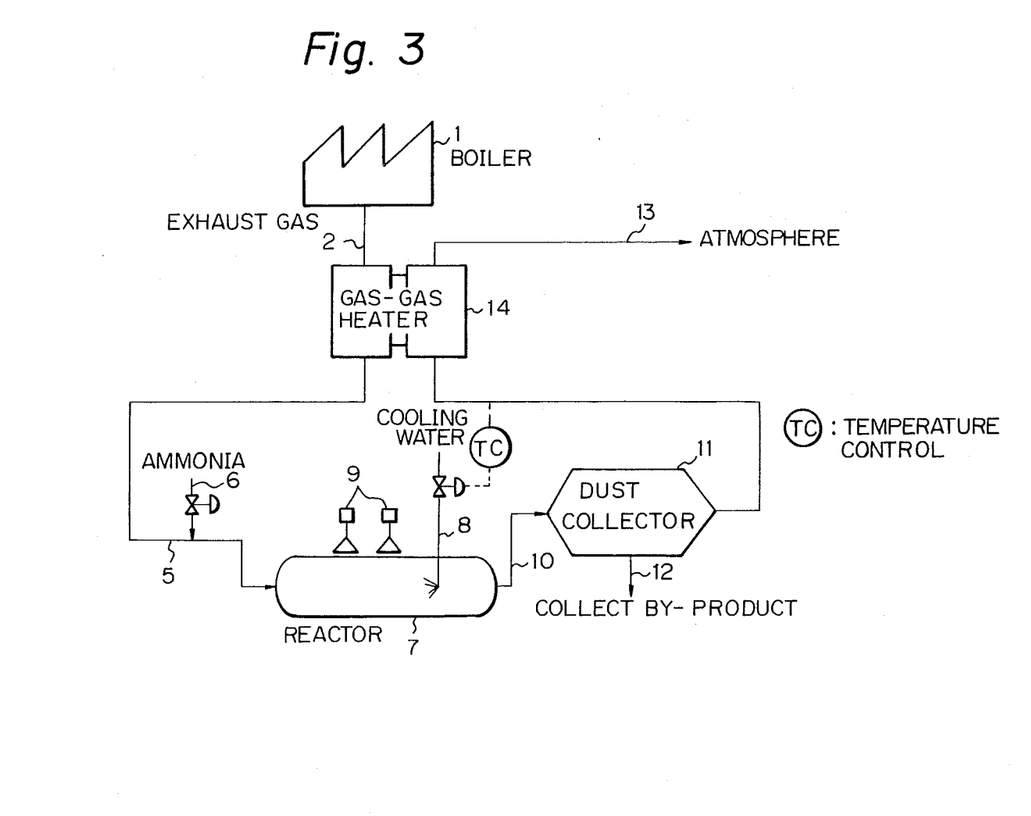
FIG. 3 is a flow sheet showing still another embodiment of the process for treating an ammonia-added effluent gas by irradiation with radiation according to the present invention in which a gas-gas heater is employed to conduct heat exchange between a high-temperature untreated gas and a treated gas having a relatively low temperature and the effluent gas is sprayed with cooling water at a position which is immediately downstream of the irradiation zone.

FIG. 3 shows still another embodiment of the present invention. In the process shown in FIG. 3, a gas-gas heater 14 is employed to conduct heat exchange between a high-temperature untreated gas and a treated gas having a relatively low temperature. This embodiment enables a reduction in the amount of cooling water required throughout the gas treating system employed in accordance with present invention and also permits the treated gas to be effectively diffused into the atmosphere by virtue of the raised temperature.

Although in the foregoing embodiments cooling water is employed as a means for adjusting the temperature of the effluent gas, addition of either air of ordinary temperature or cooling air may also be employed in place of the cooling water.

The following is a description of the dust collector that is used in the present invention. Ammonium sulfate and ammonium nitrate, which are products of the treatment, are extremely fine powder particles which have good adhesion, aggregation, and moisture absorption properties. Accordingly, in the case of a filtration type dust collector such as a bag filter, the filtration resistance increase within a relatively short period of time when a large amount of powder must be filtered. It is, therefore, necessary to increase the effective area of the filter and add a filtration aid, for example, diatomaceous earth or clay, to the effluent gas at the upstream side of the bag filter in order to prevent adhesion and aggregation of the particles on the filter, thereby preventing clogging of the filter medium. However, this dust collecting method exhibits a high dusting efficiency.

An ESP alone is usable without the fear of clogging of the sort which may be experienced in the case of a bag filter. However, where smoke regulation conditions are particularly strict, for example, where the upper limit is set at 10 mg/N$^3$, it is necessary to lower the flow velocity of the gas inside the ESP (e.g., 0.3 m/s), and this may result in an increase in the size of the equipment.

A combination of an ESP and a bag filter is capable of coping with strict smoke regulations and yet is free from the problem of clogging. More specifically, since a bag filter is disposed downstream of an ESP, it is possible for the ESP to employ a relatively high gas flow velocity (e.g., 1 to 3 m/s). Since the powder content in the effluent gas has already been reduced when the gas reaches the bag filter, there is no fear of the filtration resistance increasing within a short period of time, and it is therefore unnecessary to increase the area of the filter medium. Accordingly, it is possible to employ a compact ESP and bag filter and hence obtain an economical and preferable dust collector.

Thus, in the process of the present invention, it is possible to use an ESP alone, a bag filter alone, or a combination of an ESP and a bag filter as a dust collector, and an optimal dust collector is determined in accordance with the SO$_x$/NO$_x$ concentration at the inlet, the desulfurization rate, the denitration rate, the smoke regulations that apply, etc.

The following Examples are provided for the purpose of further illustrating the present invention but are not to be construed as limiting.

EXAMPLE 1

Figure 5:
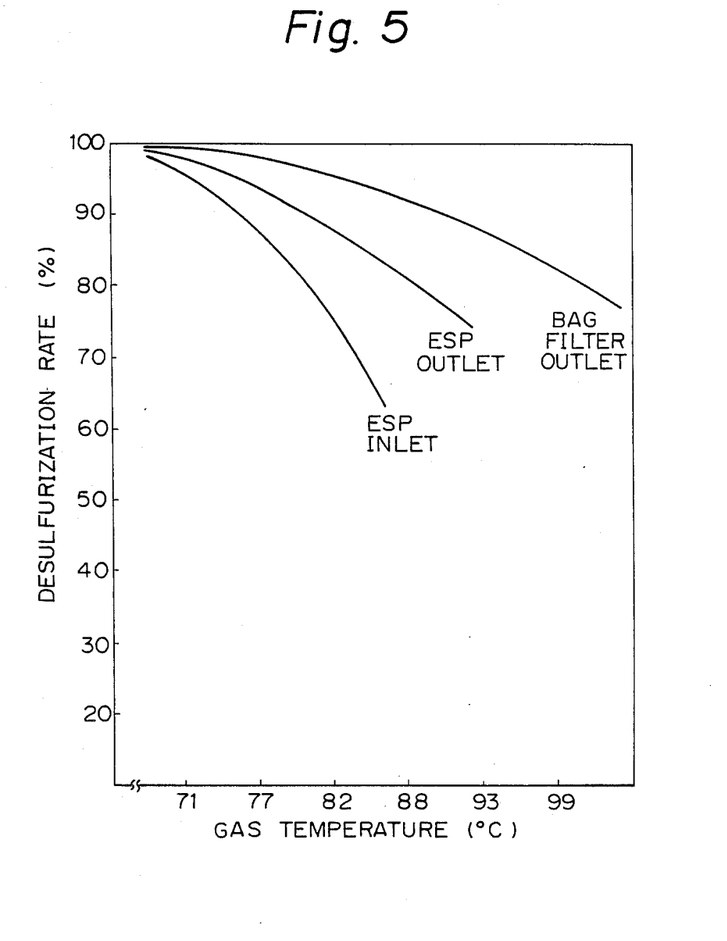
FIG. 5 is a graph showing the relationship between the gas temperature and the desulfurization rate at each of the measuring points, that is, the inlet and outlet of the EPS and the outlet of the bag filter.
Figure 6:
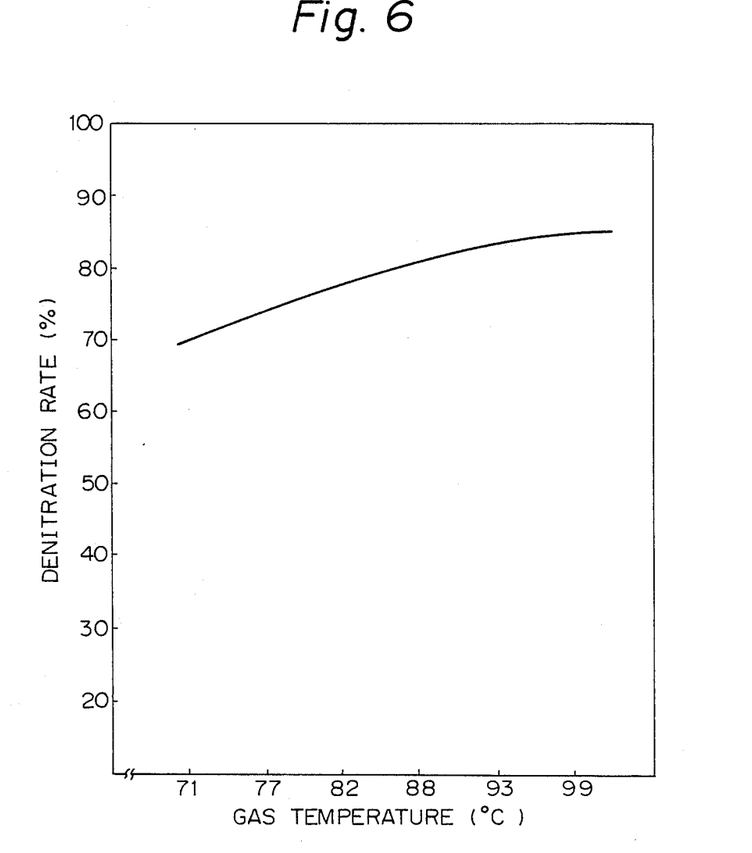
FIG. 6 is a graph showing the relationship between the gas temperature and the denitration rate.

The experimental system shown in FIG. 1 was adjusted so that the temperature of the combustion gas generated in the boiler 1 and introduced to the cooling tower 3 through the duct 2 was 150° C. at the inlet of the cooling tower 3. A dust collector comprising a combination of an ESP and a bag filter was used. The concentrations of SO$_x$, NO$_x$ and water in the effluent gas were 2,000 ppm, 350 ppm and 8.5%, respectively. The effluent gas was sprayed with water in the cooling water 3 so that the gas temperature at the outlet of the cooling tower 3 was 70° C. While passing through the duct 5, the effluent gas was mixed with 4,350 ppm (1 mole) by volume of ammonia gas so that the effluent gas would pass through the reactor 7 at a flow rate of 8,000 Nm$^3$h. In the reactor 7, the effluent gas was irradiated with an electron beam from an electron beam accelerator at a dose of 1.8 Mrad and sprayed with cooling water from the cooling water spray pipe 8' so that the effluent gas temperature at the outlet of the dust collector 11 (i.e., the outlet of the bag filter) was varied in the range of from 65 to 100° C. With the above-described conditions maintained at substantially constant levels throughout the experiment, the experimental process was continuously conducted for 8 hours. Solid by-products which were produced in the experimental process were separated by the dust collector comprising a combination of an ESP and a bag filter. When the stationary state was stably maintained, the gas temperatures at the inlet and outlet of the ESP and the outlet of the bag filter were measured and the effluent gas was sampled at the same measuring points several times to measure the concentrations of SO$_x$ and NO$_x$ in the effluent gas. Then, average values of the measured values were obtained. The results of these measurements are shown in FIGS. 5 and 6.

It should be noted that the temperature at which the humidity of the effluent gas was saturated at each sampling point was about 56° C.

EXAMPLE 2

An experiment was carried out under the same conditions as those employed in Example 1 except that the effluent gas was sprayed with cooling water at a position immediately downstream of the irradiation zone, as shown by the reference numeral 8' in FIG. 2. The dose of the applied electron beam was the same as in Example 1, that is, 1.8 Mrad. The resulting solid by-products were filtered off by the dust collector consisting of an ESP and a bag filter. The effluent gas was sampled in the same way as in Example 1 to measure the concentrations of SO$_x$ and NO$_x$ in the gas. The results of the measurement revealed that the denitration rate was about 5 to 10% higher than that in Example 1, while the desulfurization rate was almost the same as that in Example 1.

Example 3

An experiment was carried out under the same conditions as in Example 1 except that a bag filter alone was used as a dust collector. The gas temperature and the concentrations of SO$_x$ and NO$_x$ in the effluent gas were measured at the outlet of the bag filter. The results of the measurement were substantially the same as those in the case of the dust collector defined by a combination of an ESP and a bag filter (see FIGS. 5 and 6).

It will be clear from FIG. 5 that the desulfurization rate is strongly dependent on the gas temperature, that is, the lower the gas temperature, the higher the desulfurization rate, and the desulfurization reaction proceeds a great deal even in the dust collector. It will also be understood that, in the case of a dust collector defined by a combination of an ESP and a bag filter or a bag filter alone, the gas temperature is preferably adjusted to 100° C. or less, whereas, in the case of an ESP alone, the gas temperature is preferably adjusted to 90° C. or less. In either case, the lower the gas temperature, the better the results. However, since the process according to the present invention is a dry process, it is preferable that the lower limit of the gas temperature be above the temperature at which the humidity of the effluent gas is saturated. The lower-limit temperature in the case of Examples is about 56° C. Since it is understood from FIG. 5 that the desulfurization reaction in the process of the present invention proceeds a great deal below 100° C., it is preferable that the gas temperature at the inlet of the reactor should not exceed 100° C. The lower limit of the gas temperature at the inlet of the reactor is preferably set above the temperature at which the humidity of the effluent gas is saturated, because the process of the present invention is a dry process, as described above.

Although in the foregoing embodiments the effluent gas is sprayed with cooling water immediately upstream or downstream of the irradiation zone, it may also be preferable to effect temperature control using water sprays disposed at both the upstream and downstream sides of the irradiation zone, or a combination of either one of the sprays and a water spray which is disposed within the irradiation zone, in a case where the great amount of cooling water sprayed, which is determined in accordance with the conditions of the particular gas to be treated (e.g., the inlet gas temperature, water concentration, $SO_x$ concentration, $NO_x$ concentration, desulfurization rate, denitration rate, etc.).

It will be understood from FIG. 6, which shows the relationship between the gas temperature and the denitration rate, that the denitration rate is not so strongly dependent on the gas temperature as is the desulfurization rate. It should be noted that there was no difference in the denitration rate between the sampling points.

I claim:

1. A process for treating an effluent gas including the steps of leading an effluent gas containing at least one harmful component selected From the group consisting of sulfur oxides ($SO_x$) and nitrogen oxides ($NO_x$) to a radiation irradiation zone, adding ammonia ($NH_3$) to the effluent gas before, during or after the irradiation, collecting resulting reaction products including ammonium sulfate and ammonium nitrate by means of a dust collector, and releasing the effluent gas into the atmosphere, wherein the improvement comprises using as said dust collector a bag filter alone or a combination of an electrostatic precipitator and a bag filter, and spraying cooling water upon the irradiated effluent gas on the downstream side of the irradiation zone in the reactor, thereby adjusting the effluent gas temperature at the outlet of said bag filter within the range of from a temperature at which the humidity of the effluent gas is saturated to 100° C.

2. A process according to claim 1, wherein said radiation is an electron beam applied from an electron beam accelerator.

3. A process according to claim 1, wherein the amount of water sprayed is adequate to suppress the rise in temperature of the effluent gas which is caused by the absorption of radiation energy and the generation of heat resulting from the reaction of said at least one harmful components with ammonia by vaporization of droplets of sprayed water.

4. A process according to claim 3, wherein said radiation is an electron beam applied from an electron beam accelerator.

5. A process according to claim 1, wherein additional cooling water is further sprayed upon the effluent gas during the irradiation in the reactor.

6. A process according to claim 5, wherein the amount of water sprayed is adequate to suppress the rise in temperature of the effluent gas which is caused by the absorption of radiation energy and the generation of heat resulting from the reaction of said at least one harmful component with ammonia by vaporization of droplets of sprayed water.

7. A process according to claim 6, wherein said radiation is an electron beam applied from an electron beam accelerator.

8. A process according to claim 5, wherein said radiation is a electron beam applied from an electron beam accelerator.

9. A process for treating an effluent gas containing at least one harmful component selected from the group consisting of sulfur oxides ($SO_x$) and nitrogen oxides ($NO_x$) to a radiation irradiation zone, adding ammonia ($NH_3$) to the effluent gas before, during or after the irradiation, collecting resulting reaction products including ammonium sulfate or ammonium nitrate or both ammonium sulfate and ammonium nitrate by means of a dust collector, and releasing the effluent gas into the atmosphere, wherein the important comprises using an electrostatic precipitator as said dust collector, and spraying cooling water upon the irradiated effluent gas on the downstream side of the irradiation zone in the reactor, thereby adjusting the effluent gas temperature at the outlet of said electrostatic precipitator within the range of from a temperature at which the humidity of the effluent gas is saturated to 90° C.

10. A process according to claim 9, wherein said radiation is an is an electron beam applied from an electron beam accelerator.

11. A process according to claim 9, wherein the amount of water sprayed is adequate to suppress the rise in temperature of the effluent gas which is caused by the absorption of radiation energy and the generation of heat resulting from the reaction of said at least one harmful components with ammonia by vaporization of droplets of sprayed water.

12. A process according to claim 11, wherein said radiation is an electron beam applied from an electron beam accelerator.

13. A process according to claim 9, wherein additional cooling water is further sprayed upon the effluent gas during the irradiation in the reactor.

14. A process according to claim 13, wherein the amount of water sprayed is adequate to suppress the rise in temperature of the effluent gas which is caused by the absorption of radiation energy and the generation of heat resulting from the reaction of said at least one harmful component with ammonia by vaporization of droplets of sprayed water.

15. A process according to claim 14, wherein said radiation is an electron beam applied from an electron beam accelerator.

16. A process according to claim 13, wherein said radiation is an electron beam applied from an electron beam accelerator.

* * * * *